3,203,932
METALLO-ORGANIC CATALYZED ONE-SHOT PROCESS FOR PREPARING URETHANE-UREA ELASTOMERS
Kurt C. Frisch, Grosse Ile, and Seymour L. Axelrood, Trenton, Mich., assignors to Wyandotte Chemicals Corporation, Wyandotte, Mich., a corporation of Michigan
No Drawing. Filed Mar. 10, 1961, Ser. No. 94,699
20 Claims. (Cl. 260—77.5)

This invention relates to a direct, one-step method for preparing urethane-urea cast elastomers.

It is disclosed in the prior art that urethane-urea cast elastomers can be prepared by a two-step process. In the first step, an isocyanate terminated prepolymer is prepared by interacting, for example, polytetramethylene glycol and tolylene diisocyanate. In the second step, the prepolymer is interacted with a chemically hindered, aromatic diamine such as 4,4'-methylene-bis-(2-chloroaniline) under defined conditions of temperature, pressure and agitation and the reaction mixture is poured into a mold of any suitable configuration and cured at a temperature of about 100° C. whereby the desired urethane-urea elastomeric product is obtained.

It would be economically advantageous to prepare urethane-urea cast elastomers by a direct, one-step process in which all of the components necessary for fabrication of the elastomer could be simply blended together, poured into a mold of suitable configuration and cured.

However, as will be more evident from certain of the examples hereinafter set forth, merely blending a polyether polylol, tolylene diisocyanate and 4,4'-methylene-bis-(2-chloroaniline), the essential components of the two-step process, and curing the reaction mixture at a temperature of about 100° C. does not lead to the fabrication of a satisfactory elastomeric product but, instead, there is obtained an adherent, plastic, friable material.

Therefore, the principal object of this invention is to provide a process or system for preparing urethane-urea cast elastomers having advantageous physical properties by a direct, one-step method.

Another object of this invention is to provide a catalytic agent which will permit the preparation of urethane-urea elastomers by a direct, one-step method.

A further object of this invention is to provide a metallo-organic salt catalyst which catalyzes the interaction of polyether polyol, organic diisocyanate and chemically hindered, aromatic diamine into a urethane-urea elastomeric product having advantageous physical properties.

A still further object of this invention is to provide a catalytic system for the preparation of urethane-urea elastomers by a direct, one-step method wherein the catalytic agent is a polyvalent metal salt of a linear or cycloaliphatic acid having up to about 18 carbon atoms and being void of active hydrogen atoms.

In accordance with this invention, it has now been discovered that urethane-urea elastomers having good physical properties can be prepared by a direct, one-step method which comprises interacting (1) a polyoxyalkylene polylol and mixtures thereof having an average equivalent weight from about 200 to 2,000, an oxygen/carbon atom ratio from about 1/2 to 1/4 and about 2 to 6 terminal hydroxyl groups; (2) a chemically hindered, aromatic diamine, and (3) an organic diisocyanate in the presence of (4) a metallo-organic salt catalyst at a temperature of from about 0° to 120° C. and curing the reaction mixture at a temperature from about 20° to 150° C.; the diamine being employed in an amount to provde an $NH_2/OH$ ratio from about 0.5:1.8/1, the diisocyanate being employed in an amount to provide an $NCO/(OH+NH_2)$ ratio from about 0.95:1.6/1, the catalyst being employed in an amount corresponding to about 0.01 to 1.0 percent of the combined weight of a polyol and diamine, and, providing further, that the reactants are substantially anhydrous and substantially free of entrapped gas.

The polyoxyalkylene polyols, commonly referred to as polyethers, which can be employed in the direct, one-step process disclosed herein include, for example, the oxyalkylene adducts of polyol bases such as ethylene glycol, 1,2-propylene glycol, 1,3-propylene glycol, 1,2-butanediol, 1,4-butanediol, glycerine, trimethylolpropane, hexanetriol, pentaerythritol and sorbitol wherein the oxyalkylene portion is derived from monomeric units such as ethylene oxide, propylene oxide, butylene oxide and mixtures thereof. Typical polyether polyols include polyoxyethylene glycol, polyoxypropylene glycol polyoxybutylene glycol, polytetramethylene glycol and polyoxypropylene adducts of trimethylolpropane, glycerine and hexanetriol as well as the polyoxypropylene adducts of higher polyols such as pentaerythritol and sorbitol. Thus, the polyether polyols which can be employed in the one-step process for preparing elastomers are oxyalkylene polymers which have an oxygen/carbon atom ratio from about 1/2 to 1/4 and preferably an oxygen/carbon atom ratio from about 1/2.85 to 1/4 and from about 2 to 6 terminal hydroxyl groups and preferably about 2 to 4 terminal hydroxyl groups. The polyether polyols generally have an average equivalent weight from about 200 to 2,000 and preferably have an average equivalent weight from about 500 to 1,000. Polyoxypropylene glycols having molecular weights from about 400 to 4,000 corresponding to equivalent weights from about 200 to 2,000 and mixtures thereof are preferred as polyol reactants. Polyoxypropylene glycols having molecular weights from about 1,000 to 2,000 are particularly effective in preparing urethane-urea elastomers by the one-step method. Also, polyol blends such as a mixture of about 75 to 93 parts by weight of polyoxypropylene glycol having an average equivalent weight of about 1,000 and about 25 to 7 parts by weight of polyoxypropylene glycol having an average equivalent weight of about 200 can be used in preparing urethane-urea elastomers having good properties.

The term "chemically hindered, aromatic diamine" as used herein refers to an aromatic diamine which has one or more negative substituents on the aromatic ring to which the amine group is attached. Examples of such negative substituents are the halogen and nitro-groups. The chemically hindered, aromatic diamines which can be employed in preparing the elastomers by the one-step method include, for example, 4,4'-methylene-bis-(2-fluoroaniline), 4,4' - methylene - bis - (2-chloroaniline), 4,4'-methylene-bis-(2-bromoaniline), 4,4'-methylene-bis-(2-nitroaniline) and 4,4'-diamino-3,3'-dichlorodiphenyl. The primary diamine is used in an amount such that the $NH_2/OH$ ratio is from about 0.5:1.8/1 and preferably about 0.7:1.2/1. Since the diamines are crystalline materials, it is desirable to dissolve the amine in the polyoxyalkylene polyol prior to interacting the reactants.

The organic diisocyanates which can be employed in preparing urethane-urea elastomers by a direct, one-step method include, for example, polymethylene diisocyanates such as tetramethylene diisocyanate and hexamethylene diisocyanate and aromatic diisocyanates such as tolylene diisocyanate, 4,4'-diphenylmethane diisocyanate and 1,5-naphthalene diisocyanate. The diisocyanates which have melting points above about 80° C. are advantageously dissolved in an inert liquid carrier such as dibutyl phthalate, tricresyl phosphate or trioctyl phosphate so as to facilitate handling of the isocyanate as well as interaction of the isocyanate with the other components of the reaction mixture. Those isocyanates which melt at temperatures from room temperature to 80° C. can be readily used in the molten state. The organic diisocyanate is used in an amount which provides an $NCO/(OH+NH_2)$ ratio from about 0.95:1.6/1 and preferably an $NCO/(OH+NH_2)$ ratio from about 1.0:1.3/1.

The metallo-organic salt catalyst which is employed in the method of the invention is a polyvalent metal salt of an aliphatic acid having up to about 18 carbon atoms and being void of active hydrogen atoms. The organo portion of the salt may be either linear or cyclic and saturated or unsaturated. The polyvalent metal has a valence from about 2 to 4. Although trivalent and tetravalent metal salts of aliphatic acids are effective catalysts in the method of the invention, bivalent metal salts of aliphatic acids are preferred as catalysts. Typical metallo-organic salts include stannous acetate, stannous butyrate, stannous 2-ethylhexoate, stannous laurate, stannous oleate, stannous stearate, lead cyclopentane carboxylate, cadmium cyclohexane carboxylate, lead naphthenate, cobalt naphthenate, zinc naphthenate, cadmium naphthenate, dibutyltin dilaurate, dibutyltin-di-2-ethylhexoate, stannic octoate, stannic oleate and the like. The metallo-organic salt catalyst is used in an amount by weight corresponding to about 0.01 to 1.0 percent based upon the combined weight of polyether polyol and diamine and preferably in an amount by weight corresponding to about 0.015 to 0.1 percent of the combined weight of polyether polyol and diamine. Tertiary amines such as triethylenediamine and 1,2,4-trimethylpiperazine are advantageously used in conjunction with the metallo-organic salts as catalysts for the one-step method described herein.

In addition to the principal components, other additives or ingredients which may be used in the formulation in order to impart special properties to the elastomers include fillers, extenders, pigments and dyes.

The polyol, diamine and diisocyanate are interacted in the presence of a metallo-organic catalyst in the proportions set forth at a temperature from about 0° to 120° C., preferably at a temperature from about 15° to 40° C., and the reaction mixture is subsequently cured at a temperature from about 20° to 150° C. and preferably at a temperature of about 80° to 125° C. It is essential that the materials used in the process be substantially anhydrous and substantially free of entrapped gas so as to avoid bubble formation in the elastomeric product.

The direct, one-step method for preparing urethane-urea elastomers can be carried out by either batch process or continuous process.

In one embodiment of the batch process, the diamine is dissolved in the polyol at room temperature in an amount to provide a specified $NH_2/OH$ ratio and the mixture is agitated and heated at about 120° C. for two hours under a vacuum of about 3 mm. Hg in order to strip water and entrapped gas therefrom. The water content of the polyol employed in the polymerization reaction should not exceed about 0.02%. The polyol-diamine mixture is cooled to room temperature and while the mixture is maintained under agitation and vacuum, the diisocyanate, from a source which has been maintained under about 3 mm. Hg, and catalyst are metered into the mixture in amounts to provide a specified $NCO/(OH+NH_2)$ ratio and suitable catalyst concentration. Agitation is continued until the components are thoroughly mixed, i.e. from about ten seconds to two minutes. Mixing is discontinued and nitrogen is admitted into the reactor in order to bring the pressure up to atmospheric pressure. The mixture is poured into a heated mold and cured at a temperature of about 100° C. for about four hours.

In one embodiment of the continuous process, the components, in a fluid state and stripped of water and entrapped gas, are continuously pumped into a mixing nozzle which discharges the mixture into molds mounted on a conveyor and the conveyor transports the molds through a heating chamber wherein the reaction mixture is cured. A multi-component resin casting machine can be used to carry out the process on a continuous basis.

The fluid reaction mixture can be poured or charged into molds of any suitable configuration so as to prepare elastomeric products having excellent mechanical properties. Also, the reaction mixture or the components thereof can be sprayed on a surface to provide the surface with an elastomeric coating. Typical applications of urethane-urea elastomers include encapsulating and potting of electrical components, sealing or caulking compounds, printing rolls, solid tires, vibration-absorbing mounting blocks, gaskets, coatings and heels and soles for shoes.

A review covering urethane elastomer processing can be found in an article entitled "Low Durometer Cast Urethane Elastomers," by H. L. Heiss, appearing in the October 1960 issue of Rubber Age at pages 89–97.

The following examples further illustrate the invention. In these examples, the elastomers were prepared and cured in accordance with the following general procedure:

The diamine is dissolved in the polyol at room temperature in an amount to provide a specific $NH_2/OH$ ratio. The polyol-diamine blend is stripped of water and entrapped gas by heating the blend at a temperature of 120° C. for two hours under a vacuum of 3 mm. Hg. This blend constitutes a stock solution and it is stored under a nitrogen atmosphere at room temperature. A specified quantity of this solution is metered into a mixing vessel under anhydrous conditions provided by a nitrogen atmosphere. The metallo-organic salt catalyst is also metered into the mixing vessel and the resulting mixture is agitated for two hours under a vacuum of 3 mm. of Hg. At the end of two hours and while the mixture is maintained under agitation and vacuum, the organic diisocyanate, from a source which is also maintained under agitation and a vacuum of 3 mm. of Hg, is metered into the mixing vessel in an amount to provide a specified $NCO/(OH+NH_2)$ ratio and agitation is continued until the ingredients are thoroughly mixed, i.e. from about ten seconds to one minute. Agitation is discontinued and the reduced pressure is brought up to atmospheric pressure by admitting nitrogen into the mixing vessel. The mixture is then poured into a heated mold and the mold is placed in an oven maintained at 100° C. At the end of one hour, the elastomeric product is removed from the mold and heating of the elastomer is continued for three hours at 100° C. The elastomeric specimen is maintained at room temperature for fourteen days and, at the end of this aging period, the physical properties of the specimen are evaluated. The physical properties evaluated include (1) stress-strain properties, (2) Graves tear, (3) split tear, (4) compression set and (5) Shore hardness.

Stress-strain properties were measured in accordance with ASTM designation D412–51T and the tensile testing instrument employed was an Instron Model TTC–M1 in which the jaw separation was two inches and the rate of separation was twenty inches per minute.

Graves tear measurements were carried out on an Instron machine in accordance with ASTM test method D624–54, using Die C and 90° angle specimens.

Split tear measurements were carried out in accordance with Federal Testing Method FTMS–601/M4221.

Shore A hardness was measured with a Shore durometer in accordance with ASTM test method D676–58T.

Bashore rebound was measured with a Bashore resiliometer.

Compression set was measured in accordance with ASTM D395–55, Method B, except that a 25% deflection of the original thickness was used.

EXAMPLE I

This example illustrates that various polyols and blends thereof can be employed in a direct, one-step method for preparing urethane-urea elastomers.

*Table 1*

| | Weight, grams | | | | |
|---|---|---|---|---|---|
| | A | B | C | D | E |
| Ingredients: | | | | | |
| P 410 [1] | | | 7.46 | | |
| P 1010 [2] | 79.87 | | | | |
| P 2010 [3] | | 88.68 | 77.43 | | |
| TP 440 [4] | | | | | 5.0 |
| TP 3040 [5] | | | | 78.0 | 78.0 |
| Diamine [6] | 20.20 | 11.32 | 15.11 | 14.0 | 8.8 |
| TDI [7] | 27.85 | 16.90 | 21.18 | 19.0 | 19.0 |
| Tin Catalyst [8] | 0.025 | 0.025 | 0.05 | 0.3 | 0.3 |
| NH$_2$/OH ratio | 1/1 | 1/1 | 1/1 | 1.35/1 | 0.58/1 |
| NCO/(OH+NH$_2$) ratio | 1.06/1 | 1.1/1 | 1.07/1 | 1.19/1 | 1.22/1 |
| Tensile strength, p.s.i | 3,443 | 1,506 | 1,985 | 2,260 | 1,200 |
| Elongation, percent | 560 | 620 | 372 | 340 | 200 |
| 300 Modulus, p.s.i | 2,070 | 961 | 1,701 | 2,030 | |
| Graves tear, p.i | 480 | 267 | 299 | 220 | 150 |
| Split tear, p.i | 340 | 138 | 80 | 35 | 20 |
| Shore A hardness, 1 sec | 97 | 85 | 97 | 95 | 90 |
| Bashore rebound | 35 | 47 | 46 | 28 | 42 |
| Compression set, 22 hrs./158° F., 25% defl | 33.2 | 17.8 | 28.9 | 20.5 | 10.5 |

[1] Polyoxypropylene glycol, average mol. wt. 400.
[2] Polyoxypropylene glycol, average mol. wt. 1,000.
[3] Polyoxypropylene glycol, average mol. wt. 2,000.
[4] Polyoxypropylene adduct of trimethylolpropane, average mol. wt. 400.
[5] Polyoxypropylene adduct of trimethylolpropane, average mol. wt. 3,000.
[6] 4,4'-methylene-bis-(2-chloroaniline).
[7] Tolylene diisocyanate.
[8] Stannous octoate.

EXAMPLE II

This example illustrates, in part A, that a chemically hindered, aromatic diamine, 4,4'-diamino-3,3'-dichlorodiphenyl, is useful in preparing urethane-urea elastomers by a one-step method and, in part B, that an organic diisocyanate, 4,4'-diphenylmethane diisocyanate, is effective in preparing urethane-urea elastomers by a direct, one-step method.

*Table 2*

| | Weight, grams | |
|---|---|---|
| | A | B |
| Ingredients: | | |
| P 2010 [1] | 88.72 | 88.17 |
| Diamine | [2] 11.28 | [3] 11.83 |
| Diisocyanate | [4] 16.96 | [5] 25.28 |
| Stannous octoate | 0.05 | 0.025 |
| NH$_2$/OH ratio | 1/1 | 1/1 |
| NCO/(OH+NH$_2$) ratio | 1.09/1 | 1.14/1 |
| Tensile strength, p.s.i | 1,063 | 1,969 |
| Elongation, percent | 573 | 495 |
| 300% Modulus, p.s.i | 951 | 1,366 |
| Graves tear, p.i | 290 | 288 |
| Split tear, p.i | 128 | 90 |
| Shore A hardness, 1 sec | 92 | 91 |
| Bashore rebound | 45 | 42 |
| Compression set, 22 hrs./158° F., 25% defl | 29 | |

[1] Polyoxypropylene glycol, average mol. wt. 2,000.
[2] 4,4'-Diamino-3,3'-dichlorodiphenyl.
[3] 4,4'-Methylene-bis-(2-chloroaniline).
[4] Tolylene diisocyanate.
[5] 4,4'-Diphenylmethane diisocyanate.

EXAMPLE III

This example illustrates that metallo-organic salt catalysts including lead, cobalt and zinc naphthenates are effective catalysts in preparing urethane-urea elastomers by a direct, one-step method.

*Table 3*

| | Weight, grams | | |
|---|---|---|---|
| | A | B | C |
| Ingredients: | | | |
| P 2010 [1] | 88.17 | 88.17 | 88.17 |
| Diamine [2] | 11.83 | 11.83 | 11.83 |
| TDI [3] | 16.90 | 16.90 | 17.46 |
| Lead naphthenate, 24% lead | 0.025 | | |
| Cobalt naphthenate, 6% cobalt | | 0.6 | |
| Zinc naphthenate, 8% zinc | | | 0.8 |
| Tensile strength, p.s.i | 1,580 | 1,363 | 1,541 |
| Elongation, percent | 647 | 335 | 510 |
| 300% Modulus, p.s.i | 944 | 1,216 | 1,057 |
| Graves tear, p.i | 210 | 117 | 218 |
| Split tear, p.i | 79 | 25 | 61 |
| Shore A hardness, 1 sec | 84 | 80 | 86 |
| Bashore rebound | 46 | 41 | 47 |
| Compression set, 22 hrs./158° F., 25% defl | 39.4 | 15.8 | 15.2 |

[1] Polyoxypropylene glycol, average mol. wt. 2,000.
[2] 4,4'-methylene-bis-(2-chloroaniline).
[3] Tolylene diisocyanate.

EXAMPLE IV

This example illustrates that urethane-urea elastomers having good properties can be prepared by a direct, one-step method in which the NH$_2$/OH ratio can vary over broad limits.

*Table 4*

| | Weight, grams | |
|---|---|---|
| | A | B |
| Ingredients: | | |
| Polyoxypropylene glycol, average mol. wt. 2,000 | 93.71 | 75.17 |
| 4,4'-methylene-bis-(2-chloroaniline) | 6.29 | 17.63 |
| Tolylene diisocyanate | 14.28 | 20.03 |
| Stannous octoate | 0.05 | .046 |
| NH$_2$/OH ratio | 0.5/1 | 1.75/1 |
| NCO/(OH+NH$_2$) ratio | 1.16/1 | 1.11/1 |
| Tensile strength, p.s.i | 704 | 1,993 |
| Elongation, percent | 453 | 495 |
| 300% Modulus, p.s.i | 510 | 1,437 |
| Graves tear, p.i | 119 | 340 |
| Split tear, p.i | 39 | 163 |
| Shore A hardness, 1 sec | 70 | 99 |
| Bashore rebound | 49 | 49 |
| Compression set, 22 hrs./158° F., 25% defl | 13.2 | 26.7 |

EXAMPLE V

This example illustrates that urethane-urea elastomers having good properties can be prepared by a direct, one-step method in which the NCO/(OH+NH$_2$) ratio varies over broad limits.

*Table 5*

| | Weight, grams | | |
|---|---|---|---|
| | A | B | C |
| Ingredients: | | | |
| Polyoxypropylene glycol, average mol. wt. 2,000 | 84.3 | 88.17 | 88.17 |
| 4,4'-methylene-bis-(2-chloroaniline) | 10.7 | 11.83 | 11.83 |
| Tolylene diisocyanate | 19.01 | 16.90 | 16.30 |
| Stannous octoate | 0.0475 | 0.025 | 0.025 |
| NH$_2$/OH ratio | 1/1 | 1/1 | 1/1 |
| NCO/(OH+NH$_2$) ratio | 1.36/1 | 1.1/1 | 1.05/1 |
| Tensile strength, p.s.i | 1,389 | 1,506 | 1,685 |
| Elongation, percent | 547 | 620 | 930 |
| 300% Modulus, p.s.i | 994 | 961 | 845 |
| Graves tear, p.i | 209 | 267 | 252 |
| Split tear, p.i | 109 | 130 | 145 |
| Shore A hardness, 1 sec | 90 | 85 | 86 |
| Bashore rebound | 47 | 47 | 45 |
| Compression set, 22 hrs./158° F., 25% defl | 32.9 | 17.8 | 22.3 |

EXAMPLE VI

This example illustrates the significance of a metallo-organic catalyst in preparing urethane-urea elastomers by a direct, one-step method. It will be noted from this example that, in the absence of a catalyst, an unsatisfactory product is obtained.

*Table 6*

| Ingredients: | Weight, grams (A) |
|---|---|
| Polyoxypropylene glycol, average mol. wt. 2,000 | 83.76 |
| 4,4'-methylene-bis-(2-chloroaniline) | 11.24 |
| Tolylene diisocyanate | 17.5 |

After curing the reaction mixture in accordance with the general procedure, as set forth beginning in column 4, it was observed that the product was an adherent, plastic type material which readily crumbled into a powder.

EXAMPLE VII

This example illustrates that in a reaction system containing polyol, isocyanate and primary amine, the presence of a metallo-organic salt catalyst accelerates the rate at which isocyanate reacts with polyol to a higher order of magnitude than it accelerates the rate at which the isocyanate reacts with the primary amine.

*Table 7*

| | Weight, grams | |
|---|---|---|
| | A | B |
| Ingredients: | | |
| Polyoxypropylene glycol, average mol. wt. 2,000 | 2.5 | |
| 4,4'-methylene-bis-(2-chloroaniline) | | 0.33 |
| Phenyl isocyanate | 0.3 | 0.3 |
| Stannous octoate | 0.0025 | 0.0025 |
| Reaction rate, minutes | 18 | 69 |

The reaction rate measurements were carried out in toluene at 30° C. wherein the NCO/OH ratio was 1/1 and the NCO/NH₂ ratio was also 1/1. The total liquid volume was 25 milliliters. The reaction rate was determined by an infrared spectrophotometric procedure in which the rate of consumption of isocyanate was ascertained by following the decrease in intensity of the 4.5 micron isocyanate band as a function of time. The time recorded was the time required to consume one-half of the isocyanate originally present in the system.

Thus, the objects of this invention have been accomplished, namely, a direct, one-step catalytic method has been provided for preparing urethane-urea elastomers as is more particularly described herein.

What is claimed is:

1. A process for preparing urethane-urea elastomers which comprises simultaneously interacting three reactants (1), (2) and (3) in the presence of a catalyst (4), said reactant (1) being selected from the group consisting of a polyoxyalkylene polyol and mixtures thereof having an equivalent weight from about 200 to 2,000, an oxygen/carbon atom ratio from about 1/2 to 1/4 and about 2 to 6 terminal hydroxyl groups; said reactant (2) being a chemically hindered, aromatic diamine, and said reactant (3) being an organic diisocyanate in the presence of said catalyst (4) a metallo-organic salt catalyst at a temperature from about 0° to 120° C. and curing the reaction mixture at a temperature from about 20° to 150° C., said diamine being employed in an amount to provide an $NH_2/OH$ ratio from about 0.5:1.8/1, said diisocyanate being employed in an amount to provide an $NCO/(OH+NH_2)$ ratio from about 0.95:1.6/1, said catalyst being employed in an amount corresponding to 0.01 to 1.0 percent of the combined weight of polyol and diamine, and, providing further, that said reactants are substantially anhydrous and substantially free of entrapped gas.

2. A process in accordance with claim 1 wherein the polyol has an average equivalent weight from about 500 to 1,000, an oxygen/carbon atom ratio from about 1/2.85 to 1/4, and about 2 to 4 terminal hydroxyl groups.

3. A process in accordance with claim 1 wherein the interaction of the reactants is carried out at a temperature from about 15° to 40° C. and the reaction product is cured at a temperature from about 80° to 125° C.

4. A process in accordance with claim 1 wherein the diamine is employed in an amount to provide an $NH_2/OH$ ratio from about 0.7:1.2/1.

5. A process in accordance with claim 1 wherein the isocyanate is employed in an amount to provide an $NCO/(OH+NH_2)$ ratio from about 1.0:1.3/1.

6. A process in accordance with claim 1 wherein the catalyst concentration corresponds to about 0.015 to 0.1 percent of the combined weight of polyol and diamine.

7. A process for preparing urethane-urea elastomers which comprises simultaneously interacting three reactants (1), (2) and (3) in the presence of a catalyst (4), said reactant (1) being selected from the group consisting of a polyoxyalkylene polyol and mixtures thereof having an average equivalent weight from about 500 to 1,000, an oxygen/carbon atom ratio from about 1/2.85 to 1/4, and about 2 to 4 terminal hydroxyl groups; said reactant (2) being a chemically hindered, aromatic diamine, and said reactant (3) being an organic diisocyanate in the presence of said catalyst (4) being a polyvalent metal salt of an aliphatic acid having up to about 18 carbon atoms at a temperature from about 15° to 40° C. and curing the reaction mixture at a temperature from about 80° to 125° C., said diamine being employed in an amount to provide an $NH_2/OH$ ratio from about 0.7:1.2/1, said diisocyanate being employed in an amount to provide an $NCO/(OH+NH_2)$ ratio from about 1:1.3/1, said catalyst being employed in an amount corresponding to about 0.015 to 0.1 percent of the combined weight of polyol and diamine, and, providing further, that said reactants are substantially anhydrous and substantially free of entrapped gas.

8. A process in accordance with claim 7 wherein the polyol is polyoxypropylene glycol having an average equivalent weight from about 500 to 1,000.

9. A process in accordance with claim 7 wherein the diamine is 4,4'-methylene-bis-(2-chloroaniline).

10. A process in accordance with claim 7 wherein the diamine is 4,4'-diamino-3,3'-dichlorodiphenyl.

11. A process in accordance with claim 7 wherein the diisocyanate is tolylene diisocyanate.

12. A process in accordance with claim 7 wherein the polyvalent metal salt is stannous octoate.

13. A process for preparing urethane-urea elastomers which comprises simultaneously interacting three reactants (1), (2) and (3) in the presence of a catalyst (4), said reactant (1) being selected from the group consisting of a polyoxyalkylene polyol and mixtures thereof having an average equivalent weight from about 500 to 1,000 and an oxygen/carbon atom ratio from about 1/2.85 to 1/4 and from 2 to 4 terminal hydroxyl groups; said reactant (2) being 4,4'-methylene-bis-(2-chloroaniline), and said reactant (3) being tolylene diisocyanate in the presence of said catalyst (4) being stannous octoate at a temperature from about 15° to 40° C., and curing the reaction mixture at a temperature from about 80° to 125° C., said ingredients being present in proportions to provide an $NH_2/OH$ ratio from about 0.7:1.2/1, an $NCO/(OH+NH_2)$ ratio from about 1:1.3/1 and a catalyst concentration corresponding to about 0.015 to 0.1 percent of the combined weight of polyol and diamine, and, providing further, that said ingredients are substantially anhydrous and substantially free of entrapped gas.

14. A process in accordance with claim 13 wherein the polyol is polyoxypropylene glycol having an average equivalent weight of about 500.

15. A process in accordance with claim 13 wherein the polyol is a blend of about 7 to 25 parts by weight of polyoxypropylene glycol having an equivalent weight of about 200 and about 93 to 75 parts by weight of polyoxypropylene glycol having an equivalent weight of about 1,000 wherein the average equivalent weight of said blend is within the range of about 500 to 1,000.

16. A process for preparing urethane-urea elastomers which comprises simultaneously interacting three reactants (1), (2) and (3) in the presence of a catalyst (4), said reactant (1) being selected from the group consisting of a polyoxyalkylene polyol and mixtures thereof having an average equivalent weight from about 500 to 1,000, an oxygen/carbon atom ratio from about 1/2.85 to 1/4 and from about 2 to 4 terminal hydroxyl groups; said reactant (2) being 4,4'-diamino-3,3'-dichlorodiphenyl, and said reactant (3) being tolylene diisocyanate in the presence of said catalyst (4) being stannous octoate at a temperature from about 15° to 40° C. and curing the reaction mixture at a temperature from about 80° to 125° C., said ingredients being employed in amounts to provide an $NH_2/OH$ ratio from about 0.7:1.2/1, an $NCO/(OH+NH_2)$ ratio from about 1:1.3/1 and a stannous octoate concentration corresponding to about 0.015 to 0.1 percent of the combined weight of polyol and diamine, and, providing further, that said ingredients are substantially anhydrous and substantially free of entrapped gas.

17. A process for preparing urethane-urea elastomers which comprises simultaneously interacting three reactants (1), (2) and (3) in the presence of a catalyst (4); said reactant (1) being selected from the group consisting of a polyoxyalkylene polyol and mixtures thereof having an average equivalent weight from about 500 to 1,000, an oxygen/carbon atom ratio from about 1/2.85 to 1/4 and from about 2 to 4 terminal hydroxyl groups; said reactant (2) being 4,4'-methylene-bis-(2-chloroaniline), and said reactant (3) being 4,4'-diphenylmethane diisocyanate in the presence of said catalyst (4) being stannous octoate at a temperature from about 15° to 40° C. and curing the reaction mixture at a temperature from about 80° to 125° C., said ingredients being employed in amounts to provide an $NH_2/OH$ ratio from about 0.7:1.2/1, an $NCO/(OH+NH_2)$ ratio from about 1:1.3/1 and a stannous octoate concentration corresponding to about 0.015 to 0.1 percent of the combined weight of polyol and diamine, and, providing further, that said ingredients are substantially anhydrous and substantially free of entrapped gas.

18. A process for preparing urethane-urea elastomers which comprises simultaneously interacting three reactants (1), (2) and (3) in the presence of a catalyst (4); said reactant (1) being selected from the group consisting of a polyoxyalkylene polyol and mixtures thereof having an average equivalent weight from about 500 to 1,000, an oxygen/carbon atom ratio from about 1/2.85 to 1/4 and from about 2 to 4 terminal hydroxyl groups; said reactant (2) being 4,4'-diamino-3,3'-dichlorodiphenyl, and said reactant (3) being tolylene diisocyanate in the presence of said catalyst (4) being lead naphthenate at a temperature from about 15° to 40° C. and curing the reaction mixture at a temperature from about 80° to 125° C., said ingredients being employed in amounts to provide an $NH_2/OH$ ratio from about 0.7:1.2/1, an $NCO/(OH+NH_2)$ ratio from about 1:1.3/1 and a lead naphthenate concentration corresponding to about 0.015 to 0.1 percent of the combined weight of polyol and diamine, and, providing further, that said ingredients are substantially anhydrous and substantially free of entrapped gas.

19. A process for preparing urethane-urea elastomers which comprises simultaneously interacting three reactants (1), (2) and (3) in the presence of a catalyst (4), said reactant (1) being selected from the group consisting of a polyoxyalkylene polyol and mixtures thereof having an average equivalent weight from about 500 to 1,000, an oxygen/carbon atom ratio from about 1/2.85 to 1/4 and from about 2 to 4 terminal hydroxyl groups; said reactant (2) being 4,4'-diamino-3,3'-dichlorodiphenyl, and said reactant (3) being tolylene diisocyanate in the presence of said catalyst (4) being zinc naphthenate at a temperature from about 15° to 40° C. and curing the reaction mixture at a temperature from about 80° to 125° C., said ingredients being employed in amounts to provide an $NH_2/OH$ ratio from about 0.7:1.2/1, an $NCO/(OH+NH_2)$ ratio from about 1:1.3/1 and a zinc naphthenate concentration corresponding to about 0.015 to 0.1 percent of the combined weight of polyol and diamine, and, providing further, that said ingredients are substantially anhydrous and substantially free of entrapped gas.

20. A process for preparing urethane-urea elastomers which comprises simultaneously interacting three reactants (1), (2) and (3) in the presence of a catalyst (4), said reactant (1) being selected from the group consisting of a polyoxyalkylene polyol and mixtures thereof having an equivalent weight from about 200 to 2,000, an oxygen/carbon atom ratio from about 1/2 to 1/4 and about 2 to 6 terminal hydroxyl groups; said reactant (2) being an aromatic diamine selected from the group consisting of 4,4'-methylene-bis-(2 - fluoroaniline), 4,4'-methylene-bis-(2-chloroaniline), 4,4'-methylene - bis-(2-bromoaniline), 4,4'-methylene-bis-(2-nitroaniline) and 4,4'-diamino-3,3'-dichlorodiphenyl and said reactant (3) being an organic diisocyanate in the presence of said catalyst (4) which is a metallo-organic salt catalyst selected from the group consisting of stannous acetate, stannous butyrate, stannous 2-ethylhexoate, stannous laurate, stannous oleate, stannous stearate, lead cyclopentane carboxylate, cadmium cyclohexane carboxylate, lead naphthenate, cobalt naphthenate, zinc naphthenate, cadmium naphthenate, dibutyltin dilaurate, dibutyltin di-2-ethylhexoate, stannic octate and stannic oleate, at a temperature from about 0° to 120° C. and curing the reation mixture at a temperature from about 20° to 150° C., said diamine being employed in an amount to provide an $NH_2/OH$ ratio from about 0.5:1.8/1, said diisocyanate being employed in an amount to provide an $NCO/(OH+NH_2)$ ratio from about 0.95:1.6/1, said catalyst being employed in an amount corresponding to 0.01 to 1.0 percent of the combined weight of polyol and diamine, and, providing further, that said reactants are substantially anhydrous and substantially free of entrapped gas.

References Cited in the file of this patent

UNITED STATES PATENTS

| | | | |
|---|---|---|---|
| 2,929,800 | 3/60 | Hill | 260—77.5 |
| 3,000,757 | 9/61 | Johnston | 260—77.5 |
| 3,010,923 | 11/61 | Ikeda | 260—77.5 |
| 3,036,996 | 5/62 | Kogon | 260—77.5 |

FOREIGN PATENTS 815,122  6/59  Great Britain.

OTHER REFERENCES

Chemistry of Organometallic Compounds, Rochow, Hurd, and Lewis, page 5.
Hackh's Chemical Dictionary, p. 597, 3rd edition.
Journal of Applied Polymer Science, vol. IV, No. 11 (pages 207–211), 1960.
Chemical Week, September 17, 1960, page 55.
Mobay: T.L.B., #28–F9, July 20, 1959.

LEON J. BERCOVITZ, *Primary Examiner.*

H. N. BURSTEIN, DONALD E. CZAJA, *Examiners.*